United States Patent Office 2,971,888
Patented Feb. 14, 1961

2,971,888

CONCENTRATED, STABLE AQUEOUS SOLUTIONS OF DIETHOXY-(DIETHOXYBENZYL) ISOQUINOLINE HYDROCHLORIDE

Peter C. Hereld, Bergenfield, N.J., assignor to Chemo Puro Manufacturing Corporation, Newark, N.J., a corporation of New York No Drawing. Filed June 20, 1958, Ser. No. 743,471

5 Claims. (Cl. 167—65)

This invention relates to concentrated, stable aqueous solutions of diethoxy-(diethoxybenzyl) isoquinoline hydrochloride containing up to about 7.5% of the said compound.

Diethoxy-(diethoxybenzyl) isoquinoline hydrochloride, also known as ethaverine hydrochloride or ethylpapaverine, is a well known antispasmodic widely used in tablet and capsule form, due to its favorable therapeutic index as compared with papaverine, for relaxing the smooth muscle of the bronchial and coronary systems, intestinal and biliary tracts, ureter, etc. Unlike papaverine, it is not habit-forming and is not considered as a narcotic. Due to its low solubility in water, approximately 1%, and in organic solvents it has not been possible to prepare solutions of a concentration suitable for oral and parenteral administration and this fact has prevented its large scale use in liquid forms.

According to the present invention it has now been found that, by combining diethoxy-(diethoxybenzyl) isoquinoline hydrochloride with 3-o-toloxy-1,2-propanediol and guaiacol glyceryl ether, relatively concentrated aqueous solutions of diethoxy-(diethoxybenzyl) isoquinoline hydrochloride of concentrations up to 7.5% can be readily made which are entirely suitable for oral and parenteral administration and which solutions are stable. This discovery is particularly surprising and unexpected since 3-o-toloxy-1,2-propanediol and guaiacol glyceryl ether are themselves only very sparingly soluable in water to the extent of about 1% and 5%, respectively, and it therefore could not be predicted that they would be solubilizing agents for or would exert solubilizing action on the liethoxy-(diethoxybenzyl) isoquinoline hydrochloride. The two solubilizing agents are also well known therapeutic agents, the former being known under the name of mephenesin and the latter under the name of guayanesin. Both are antispasmodics.

A solution responding to the invention comprises, per 100 parts, by weight, 7.5 parts of ethaverine hydrochloride, 20 parts of mephenesin and 40 parts of guayanesin, with the balance being water. These proportions and ratios of constituents have been found to be best and are, therefore, preferred, but it is understood that the proportions and ratios can be varied without losing the benefits of the invention. It will further be apparent that the individual solubilities in water of the mephenesin and guayanesin have been markedly increased by their combined use with ethaverine hydrochloride.

The above preferred solution is prepared by any one of the following methods wherein the parts of the antispasmodics are by weight:

(1) Twenty (20) parts of mephenesin are physically admixed with forty (40) parts of guayanesin. The mixture is added to thirty (30) parts, by weight, of cold, warm or boiling water and heated until the powder mixture has completely dissolved. Seven and one-half (7.5) parts of ethaverine hydrochloride are added to the warm solution and gentle boiling is carried out until the ethaverine hydrochloride has dissolved, whereupon enough water is added to make 100 parts.

(2) Mephenesin (20 parts), guayanesin (40 parts) and ethaverine hydrochloride (7.5 parts) are physically admixed and added to 30 parts of water and the whole heated until dissolution is complete. Enough water is added to make 100 parts.

(3) Mephenesin (20 parts), guayanesin (40 parts) and ethaverine hydrochloride (7.5 parts) are suspended in 32.5 parts of cold water and the suspension subjected to mechanical shaking for twelve to twenty-four hours until a clear solution has been obtained.

By appropriately increasing the amount of water, other concentrations can be prepared, such as 5% or 2% of the ethaverine hydrochloride or any other desired percentage above that normally soluable in water up to and including about 7.5%. Such solutions are all clear and stable and suitable for oral and parenteral administration. They have the same utility as ethaverine hydrochloride itself.

It has furtehr been found that the mephenesin and guayanesin need not necessarily be used in the above 1:2 ratio as satisfactory solutions can be made using other ratios such as 1:1.

By means of the new solutions of the invention, ethaverine hydrochloride can be used in liquid forms for oral and parenteral administration and can be packaged in any of the conventional manners for those purposes such as in bottles and ampules. The invention thus makes it possible for the first time to prepare aqueous products containing ethaverine hydrochloride in liquid form wherein the concentration of ethaverine hydrochloride is greater than that of the normal solubility thereof in water.

The invention is defined by the appended claims.

What is claimed is:

1. A concentrated, stable aqueous solution of diethoxy-(diethoxybenzyl) isoquinoline hydrochloride containing diethoxy-(diethoxybenzyl) isoquinoline hydrochloride, 3-o-toloxy-1,2-propanediol and guaiacol glyceryl ether, the concentration of diethoxy-(diethoxybenzyl) isoquinoline hydrochloride present in the aqueous solution being greater than its normal solubility in water and ranging up to and including about 7.5%.

2. An orally and parenterally administrable concentrated, stable aqueous solution having anti-spasmodic activity and approximately comprising per each 100 parts by weight, 7.5 parts of diethoxy-(diethoxybenzyl) isoquinoline hydrochloride, 20 parts of 3-o-toloxy-1,2-propanediol and 40 parts of guaiacol glyceryl ether, the balance being water.

3. An orally and parenterally administrable concentrated, stable aqueous solution having anti-spasmodic activity and approximately comprising per each 100 parts by weight, 7.5 parts of diethoxy-(diethoxybenzyl) isoquinoline hydrochloride, 30 parts of 3-o-toloxy-1,2-propanediol and 30 parts of guaiacol glyceryl ether, the balance being water.

4. A stable aqueous solution consisting essentially of the following constituents in approximately the following amounts, by weight, per 100 parts:

| | Parts |
|---|---|
| Diethoxy-(diethoxybenzyl) isoquinoline hydrachloride | 2 to 7.5 |
| 3-o-toloxy-1,2-propanediol | 20 to 30 |
| Guaiacol glyceryl ether | 40 to 30 |
| Water | Balance |

5. The method of increasing the solubility of diethoxy-(diethoxybenzyl) isoquinoline hydrochloride in water from its normal solubility of approximately 1% up to about 7.5% which comprises combining with 2 to 7.5 parts thereof 20 to 30 parts of 3-o-toloxy-1,2-propanediol and 40 to 30 parts of guaiacol glyceryl ether, water being added to make 100 parts.

References Cited in the file of this patent

UNITED STATES PATENTS

| 2,628,185 | Lewenstein | Feb. 10, 1953 |
| 2,901,472 | Ruben | Aug. 25, 1959 |

OTHER REFERENCES

Jenkins et al.: "The Chemistry of Organic Medicinal Products," John Wiley and Sons, Inc., N.Y., 1957; p. 82, 1st and 2nd sentences of paragraph beginning at bottom of the page; pp. 85–86 and pp. 375–376.